United States Patent [19]
Slater

[11] Patent Number: 5,956,347
[45] Date of Patent: Sep. 21, 1999

[54] DIGITAL TELECOMMUNICATIONS TRANSMISSION SYSTEMS

[75] Inventor: Iain J Slater, Nottingham, United Kingdom

[73] Assignee: Marconi Communications Limited, United Kingdom

[21] Appl. No.: 08/834,343

[22] Filed: Apr. 16, 1997

[30] Foreign Application Priority Data

Apr. 16, 1996 [GB] United Kingdom .................. 9607891

[51] Int. Cl.⁶ .................................. H04J 3/06; H04J 3/04
[52] U.S. Cl. ................................. 370/503; 370/535
[58] Field of Search .................................. 370/503, 508, 370/509, 510, 512, 514, 516, 535, 539, 538, 542, 909, 906, 901; 375/371, 372, 376

[56] References Cited

U.S. PATENT DOCUMENTS

| | | |
|---|---|---|
| 5,402,452 | 3/1995 | Powell et al. ............................ 370/516 |
| 5,404,380 | 4/1995 | Powell et al. ............................ 370/516 |
| 5,563,891 | 10/1996 | Wang ...................................... 370/516 |

*Primary Examiner*—Huy D. Vu
*Assistant Examiner*—Chiho Andrew Lee
*Attorney, Agent, or Firm*—Kirschstein, et al.

[57] ABSTRACT

In an SDH telecommunications system, a buffer overfill/underfill problem, which is consequent upon either a synchronization failure or an excessive amount of wander, is overcome by detecting such failure or wander and temporarily changing the mode of operation of a de-synchronizer at a terminating end of the SDH path. A Synchronization Status Messaging Byte (SSMB) is used as an indicator of the quality of the incoming bearer timing.

8 Claims, 3 Drawing Sheets

DIGITAL TELECOMMUNICATIONS TRANSMISSION SYSTEMS

FIELD OF THE INVENTION

The present invention concerns digital telecommunications data transmission systems and is particularly concerned with data transmission involving what is known as the Synchronous Digital Hierarchy (SDH). SDH involves the multiplexing of lower rate signals into a hierarchy of higher rate signals which are all nominally synchronous. More especially the present invention is concerned with overcoming the problem of underfill or overfill of the primary rate re-timing buffer in an SDH telecommunication system subsequent to a synchronisation failure.

BACKGROUND OF THE INVENTION

A key requirement for SDH equipment is to offer compatibility with functions provided by the existing Plesiochronous Digital Hierarchy (PDH) networks. Accurate network timing is needed for some applications, where phase information is critical in the timing component of the delivered signal. Such timing is usually transported and delivered in existing networks, as a component of information within the primary rate traffic signal. Normally the primary rate traffic signal is nominally at 2 Mbit/s. For the purpose of this specification it will be assumed that the 2 Mbit/s signal is the primary rate signal. However this is not a factor in the actual basis of the present invention as in principle such timing can be transported and delivered at any frequency or can be derived from any constant digital bit rate, and then rescaled to the appropriate frequency for local use.

Where accurate network timing is lost the consequence is either a reduction of performance margins at some point in the network, leading to an increased risk of digital errors as normal parameter variation occurs, or else to errors being directly introduced—usually at a low rate of occurrence, but nonetheless unacceptable for critical applications.

For some applications the delivery of accurate network timing is now widely accepted as being unavailable in SDH, at least in the way in which timing is transported in the PDH network, as a component of the 2 Mbit/s signal carried across the network.

In SDH the 2 Mbit/s signal is transported in a virtual container (VC), whose location in time in relation to a frame timing reference, is defined by a pointer. Pointer adjustments in SDH produce phase disturbances in the timing component of the delivered 2 Mbit/s, which can cause problems in establishing network synchronisation, for example with exchange synchronisation arrangement. Good timing delivery is possible in principle over a point-to-point link, because pointers are not expected to change here, but in real networks it is necessary to allow for transmission via add-drop multiplexers (muxes), hubs, cross-connects, etc. all of which may introduce changes in the values of pointers attached to VCs.

Discussions are continuing to establish accepted standards on ways to modify SDH in order to overcome this problem, but techniques proposed so far generally require that all nodes along an SDH path be equipped with conforming equipment, which effectively means that these techniques be approved as standards. Such solutions may be impractical because of the existence of significant quantities equipment to the initial standard.

In the absence of such new techniques, the distribution of network timing over SDH networks is assumed to be via the SDH optical bearer usually with dedicated clock outlets driven at a primary rate—2048 or 1544 kbit/s as appropriate for the territory—from the received bearer timing after rescaling from its transmission bit rate. Only one or two such outlets would normally be fitted per equipment and they would be usable only by equipment which had been designed to accept timing via ports which are separate from data ports.

These outlets would be of no practical use in one of the most likely situations, where a customer is connected to an SDH element in the network, via a conventional 2 Mbit/s link over for example a copper pair, an optical fibre or a radio bearer. In these cases the provision of another 2 Mbit/s connection just for timing purposes would be uneconomic; in effect those customer services which require network-synchronous operation would suffer a severe cost penalty.

In the applicants earlier UK Patent No. GB 2,257,603 there is described an arrangement in which buffers are provided at the final termination of the SDH path in the path of the extracted 2 Mbit/s or primary rate data signal, in order to smooth out short term phase disturbances. However, in certain circumstances such a buffer can be overloaded and thus overflow and this in turn will result in data corruption. That Patent discloses an arrangement in which there is an overflow detector to prevent such a buffer from overflowing.

In SDH, a method exists to carry primary rate signals, at 1.544 Mbit/s or 2.048 Mbit/s, within a synchronous frame structure. The technical details for this process are well documented in International Standards (ITU TSS Recommendations G.707, G.708 and G.709). However, these signals can, under normal conditions, experience phase steps of up to 8 $\mu$s in a period of a few seconds. If the externally connected exchange equipment is intolerant to sudden changes in phase, the signal will be rejected as faulty. To prevent this problem a primary rate re-timing buffer can be employed at the terminating end of an SDH traffic path which smooths out short term phase disturbances. Using a pointer cancelling technique within these buffers (see the Applicants UK Patent Application No. GB 2300543), an operator can pass primary rate timing from a network synchronised to one frequency (f1), via an SDH network synchronised to a difference frequency (f2). If f1 equals f2 then the primary rate timing can be carried via the SDH bearer (see the Applicants UK Patent No. GB 2,257,603)

However, these techniques may not be adequate when a long term and severe synchronisation failure occurs in the SDH transmission system. In such a situation the re-timing buffers will tend to fill or empty in one direction and therefore a mechanism is required to avoid an overflow or underflow occurring and causing loss of traffic. Even if the synchronisation failure does not last long enough to threaten an overflow/underflow, nevertheless the buffer can be left in a less than ideal position by being near either its upper or lower capacity limits. An object of the present invention is to provide a method of, and apparatus for overcoming overflow/underflow problems of a primary rate re-timing buffer in an SDH system.

SUMMARY OF THE INVENTION

Thus according to the present invention in a Synchronous Digital Hierarchy (SDH) telecommunications system a method of overcoming a primary rate re-timing buffer overfill/underfill problem consequent upon either a synchronisation failure or an excessive amount of wander said method comprising the steps of:

(a) detecting such failure or wander; and (b) temporarily changing the mode of operation of a de-synchroniser at the terminating end of the SDH path to prevent the overfill or underfill of the primary rate re-timing buffer.

Although the temporary change in the mode of operation of the de-synchroniser may introduce phase disturbances which the buffer had originally been intended to eliminate, in the context of a synchronisation failure this is found to be acceptable.

Advantageously a synchronisation failure is detected from a special overhead time slot within the primary rate signal.

More particularly in accordance with International Standards an overhead information byte within the Synchronous Transport Module (STM-N) frame structure is reserved for carrying a Synchronisation Status Messaging Byte (SSMB). This messaging byte is used to carry a Synchronisation Status Messaging (SSM) code to indicate the quality of the synchronisation being carried on the STM-N bearer. An SDH multiplexer equipment can, by monitoring these bytes on all incoming STM-N ports, select the signal with the highest synchronisation quality as the equipment timing source. If a severe synchronisation failure occurs in the SDH network this will be represented by a low quality within the SSMB.

A recent addition to International Standards has been the extension of the above synchronisation quality signalling to primary rate traffic signals. An overhead timeslot has been allocated to carry the Synchronisation Messaging Byte which can indicate that the primary signal rate no longer carries high quality timing following a severe synchronisation failure in the SDH network. Thus according to a preferred embodiment of the invention a synchronisation failure is detected from the primary rate timing using the synchronous transport module (STM-N) bearer or the average data rate in response to the quality of incoming bearer timing as represented by the Synchronous Status Messaging Byte (SSMB).

Advantageously the method further comprises changing the re-timing mode of the outgoing primary rate data signal using the incorporated SSMB synchronisation quality indicator.

In a preferred embodiment the method further comprises providing a variable store bias control to create an average rate read clock out of an SDH de-synchroniser which can have different fixed phase positions for normal operation.

BRIEF DESCRIPTION OF THE DRAWINGS

How the invention may be carried out will now be described by way of an example only and with reference to the accompanying drawings in which.

DETAILED DESCRIPTION OF THE INVENTION

Figure 1:
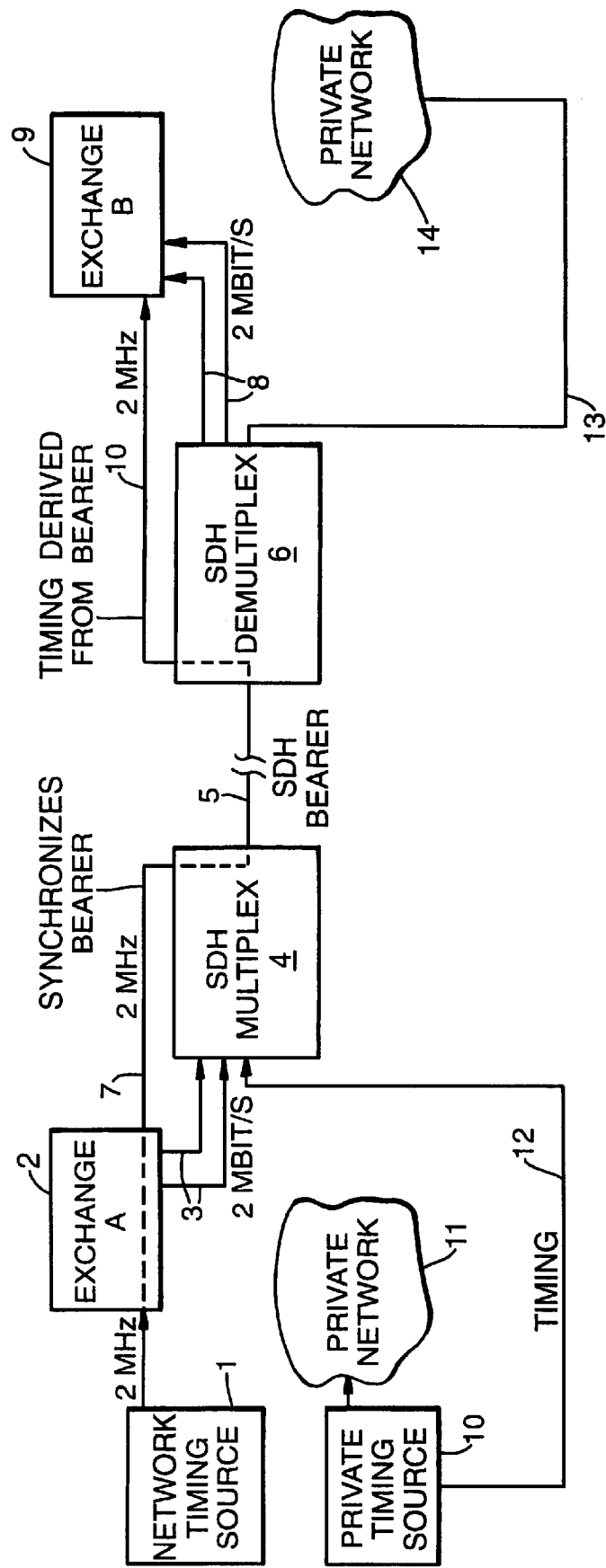
FIG. 1 is a schematic representation of an Synchronous Digital Hierarchy (SDH) Network.

Referring to FIG. 1 an SDH network comprises a network timing source 1 which feeds an eg. 2 MHz clock signal into an exchange 2. The exchange 2 feeds 2 Mbit/s signal over N, as shown N is equal to two signal connections 3 into an SDH multiplexer 4 to produce a multiplexed STM-N signal. The multiplexed STM-N signal is then fed over an SDH bearer 5 to an SDH demultiplexer 6. The exchange 2 is also connected to the SDH multiplexer 4 by a control line 7 which synchronises the bearer 5 at the 2 MHz clock rate. Within the SDH demultiplexer 6 the signal is converted back into the 2 Mbit/s primary rate format and fed over lines 8 to an exchange 9. A line 10 corresponding to line 7 is provided between the SDH demultiplexer 6 and the exchange 9 for deriving timing information from the bearer 5.

In addition and by using a retiming arrangement, a third party user can use the SDH network for conveying timing and other data from a private network 11. A private timing source 10, which is not synchronous with the network timing source 1, transmits timing signals, i.e. primary rate signals at 1.544 Mbit/s or 2.048 Mbit/s through a link 12 to the SDH multiplexer 4. After demultiplexing the timing signals are conveyed along line 13 to the private network 14.

Figure 2:
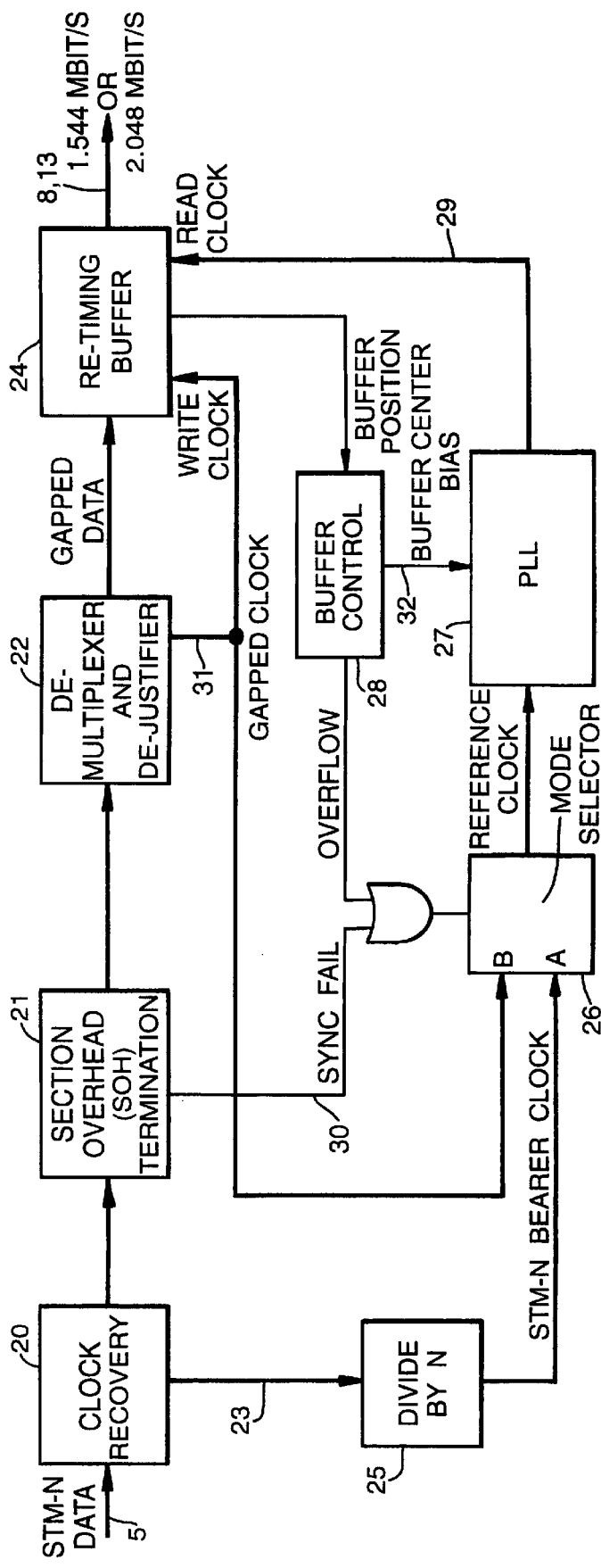
FIG. 2 is a block diagram illustrating one embodiment of the present invention.

Referring to FIG. 2, this shows in more detail the demultiplexing, de-synchronising and buffer arrangements of the present invention.

A multiplexed STM-N signal 5 fed over an SDH bearer is input to a clock recovery circuit 20 where a clock signal is stripped off on to line 23. This clock is divided by N at a divider 25 and the resulting STM-N bearer clock fed to a first input A of a mode selector 26.

The clock recovery output is passed to a Section Overhead (SOH) termination 21 and thence to a demultiplexer and de-justifier 22 the output from which is fed to a primary rate re-timing buffer 24 which in turn outputs the 1.544 Mbit/s or 2.048 Mbit/s signal at lines 8, 13.

A phase locked loop (PLL) 27 is operative to take as an input the bearer reference clock signal taken from 20 and to output a modified read clock signal via line 29 for use in retiming data out of the primary rate re-timing buffer 24. The phase locked loop signal on 29 can be derived in a number of ways determined by the two-position mode selector 26, which has inputs A and B, and a buffer control or monitor 28 by which the fill state of the buffer 24 is monitored.

Any temporary loss of synchronisation or normal amounts of wander in the SDH network will be accommodated within the primary rate re-timing buffer store 24. If SDH network synchronisation is lost for a long period of time the effect would eventually be an underflow or overflow of the buffer 24.

This condition is one with which the present invention is concerned.

The buffer 24 receives 'gapped' data from the de-multiplexer 22 which has the correct average data rate but contains blank periods due to removed overhead time slots and the de-justification process. Thus the buffer 24 absorbs temporary phase transients cause by the extraction of overhead and justification bytes.

When the re-timing buffer 24 is operating in a fault-free, synchronous network the read clock 29 for the final data output is derived from STM-N bearer 23 by having the mode selector in FIG. 1 set to position A. When used to provide a primary rate re-timing function the buffer 24 incorporates extra storage capacity to handle around 40 microseconds of network wander.

However, when a severe synchronisation fault occurs in the SDH network, a Synchronisation Status Messaging (SSM) code is received in the Section Overhead (SOH)

processor 21. When the incoming Synchronisation Status Messaging Byte (SSMB) falls below a threshold value a synchronisation (sync) fail signal is generated by the processor 21 and fed to the mode selector 26 via line 30 to cause the mode selector 26 to change to position B. In this position the de-synchroniser PLL 27, uses the gapped 'write' clock signal at 31 appearing as a reference so that the 'read' clock signal at 29 is continually adjusted, so as to maintain the level of buffer fill at the position indicated by the buffer control 28 at the time when the fault occurred. This level is set by a buffer centre bias signal 32 from the primary re-timing buffer 24 and informs the PLL 27 of the nominal operating point to be maintained. The change of the Synchronisation Status Messaging (SSM) code is also signalled in the SSMB carried within the outgoing primary rate signal appearing at lines 8, 13 thus enabling external equipment to recognise the degraded condition of the signal's timing quality.

Selection of Mode B can also occur without a synchronisation failure but when an excessive amount of wander is present in the SDH network. This wander can cause the buffer 24 to fill-up/empty and by temporarily switching to Mode B, with the buffer centre bias 32 offset to a point further from the buffer limits, any overflow/underflow can be avoided.

By using the technique described herein, the primary re-timing buffer 24 can accommodate network wander without any transitory phase disturbances on the output data port. When a severe synchronisation failure occurs in the SDH network the buffer fill position is maintained. Short term phase disturbances may occur in this condition but the failure event is signalled via the SSMB. Upon recovery of network synchronisation, wander is accommodated once more without phase disturbance.

Figure 3:
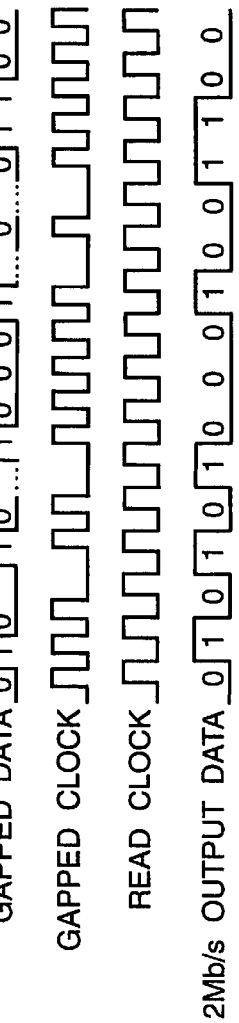
FIG. 3 illustrates the data flows and clock pulses at the points indicated.
Figure 4:
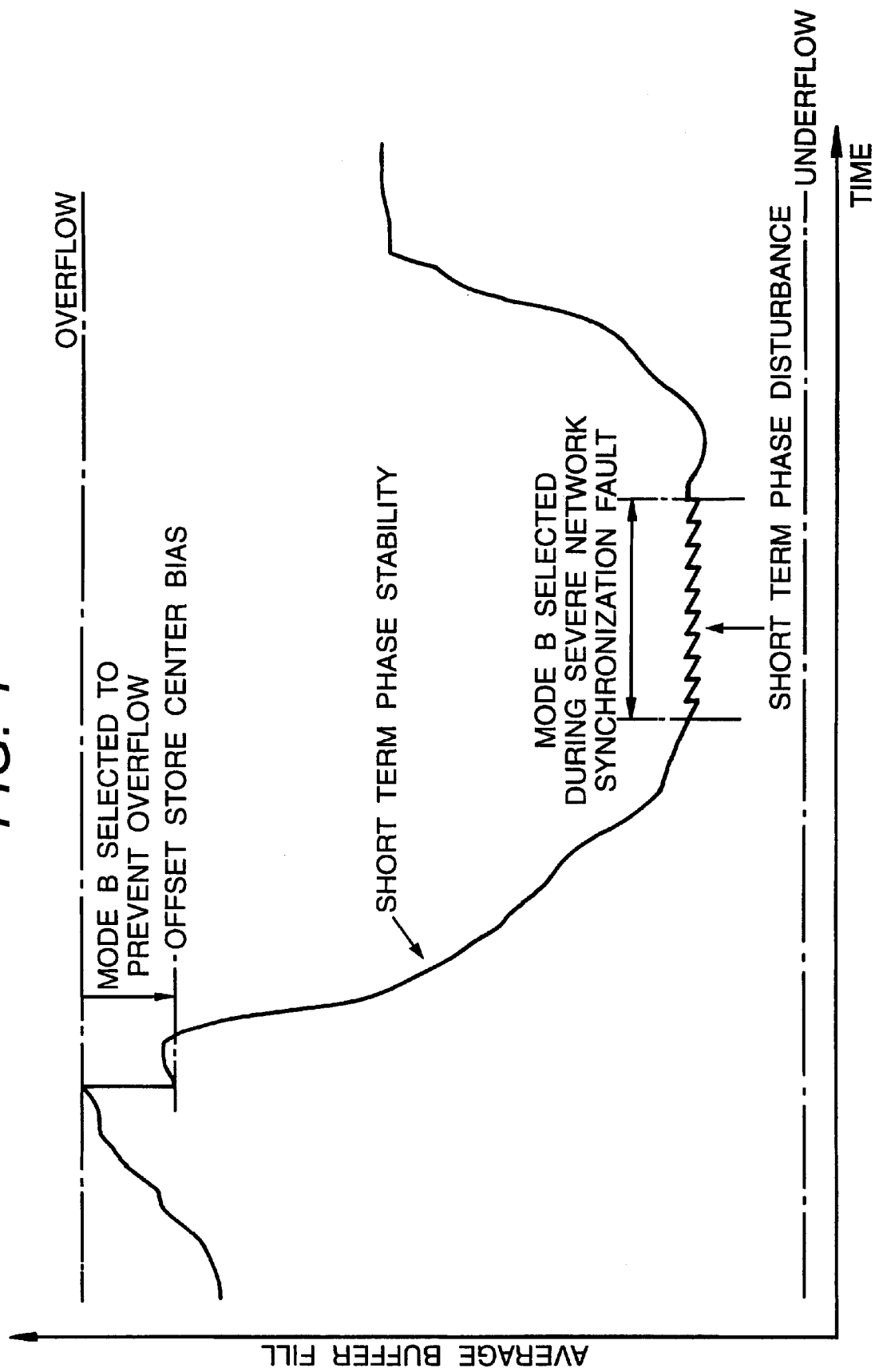
FIG. 4 is a graph illustrating the fill/unfill performance characteristics of the buffer included in the embodiment of FIG. 1.

FIG. 4 shows the average buffer fill before and a network synchronisation disturbance and it also shows the avoidance of buffer overflow in a synchronised network by temporary selection of mode B with an offset buffer centre bias. FIG. 3 shows the outputs at the points indicated in FIG. 2.

What I claim is:

1. In a Synchronous Digital Hierarchy (SDH) telecommunications system, a method of overcoming a primary rate re-timing buffer overfill/underfill problem consequent upon either a synchronization failure or an excessive amount of wander, said method comprising the steps of:

a) detecting said failure or wander from a primary rate timing using either a Synchronous Transport Module (STM-N) bearer or an average data rate in response to the quality of incoming bearer timing as represented by a Synchronization Status Messaging Byte (SSMB); and b) temporarily changing the mode of operation of a de-synchronizer at a terminating end of an SDH path to prevent the overfill or underfill of the primary rate re-timing buffer.

2. The method according to claim 1; and further comprising the step of changing a re-timing mode of an outgoing primary rate data signal using an incorporated SSMB synchronization quality indicator.

3. The method according to claim 1; and further comprising the step of providing a variable store bias control to create an average rate read clock out of an SDH de-synchronizer which has different fixed phase positions for normal operation.

4. The method according to claim 2; and further comprising the step of providing a variable store bias control to create an average rate read clock out of an SDH de-synchronizer which has different fixed phase positions for normal operation.

5. In a Synchronous Digital Hierarchy (SDH) telecommunications system, an apparatus for overcoming a primary rate re-timing buffer overfill/underfill problem consequent upon either a synchronization failure or an excessive amount of wander, said apparatus comprising:

a) detecting means for detecting said failure or wander, the detecting means including means for deriving a primary rate timing from either a Synchronous Transport Module (STM-N) bearer or an average data rate in response to the quality of incoming bearer timing as represented by a Synchronization Status Messaging Byte (SSMB); and b) means for temporarily changing the mode of operation of a de-synchronizer at a terminating end of an SDH path in response to the detecting means to prevent the overfill or underfill of the primary rate re-timing buffer.

6. The apparatus according to claim 5; and further comprising means for changing a re-timing of an outgoing primary rate data signal using an incorporated SSMB synchronization quality indicator.

7. The apparatus according to claim 5; and further comprising means for generating a variable store bias control which is operable to create an average rate read clock out of an SDH de-synchronizer which has different fixed phase positions for normal operation.

8. The apparatus according to claim 6; and further comprising means for generating a variable store bias control which is operable to create an average rate read clock out of an SDH de-synchronizer which has different fixed phase positions for normal operation.

* * * * *